United States Patent
Fernandez et al.

(10) Patent No.: US 9,790,057 B2
(45) Date of Patent: Oct. 17, 2017

(54) APPARATUS AND METHOD FOR ALIGNMENT OF ELEVATOR GUIDE RAILS

(71) Applicant: KONE Corporation, Helsinki (FI)

(72) Inventors: Alejandro Revuelta Fernandez, Espoo (FI); Mikael Haag, Vantaa (FI); Pekka Kilpeläinen, Oulu (FI); Leif Køll, Espoo (FI)

(73) Assignee: KONE CORPORATION, Helsinki (FI)

( * ) Notice: Subject to any disclaimer, the term of this patent is extended or adjusted under 35 U.S.C. 154(b) by 244 days.

(21) Appl. No.: 14/738,262

(22) Filed: Jun. 12, 2015

(65) Prior Publication Data
US 2015/0360913 A1    Dec. 17, 2015

(30) Foreign Application Priority Data

Jun. 13, 2014   (EP) .................................. 14172312

(51) Int. Cl.
*B66B 19/00*   (2006.01)
*B66B 7/12*    (2006.01)
*G01D 5/20*    (2006.01)

(52) U.S. Cl.
CPC .......... *B66B 19/002* (2013.01); *B66B 7/1246* (2013.01); *G01D 5/2006* (2013.01)

(58) Field of Classification Search
CPC .... B66B 19/002; B66B 7/1246; G01D 5/2006
See application file for complete search history.

(56) References Cited

U.S. PATENT DOCUMENTS

| 2,402,888 | A | * | 6/1946 | Hall | B66B 5/0087 33/404 |
| 5,214,947 | A | * | 6/1993 | Sissala | G01B 5/285 72/17.3 |
| 5,931,264 | A | * | 8/1999 | Gillingham | B66B 7/1246 104/127 |
| 8,256,582 | B2 | * | 9/2012 | Qiu | B66B 19/00 187/391 |

(Continued)

FOREIGN PATENT DOCUMENTS

| EP | 0 905 080 A2 | 3/1999 |
| JP | 10-53381 A | 2/1998 |

*Primary Examiner* — Michael Riegelman
(74) *Attorney, Agent, or Firm* — Birch, Stewart, Kolasch & Birch, LLP

(57) ABSTRACT

The apparatus includes a stationary part being attachable to an elevator guide rail element at a predetermined height above a joint between two consecutive end-on-end mounted elevator guide rail elements. An elongated measuring frame having an upper end and a lower end is supported from the upper end with an articulated joint at the stationary part. A number of inductive sensors are positioned on the measuring frame, whereby at least a part of the inductive sensors are directed in a first direction being the direction between the guide rails towards a tip of the guide rail elements, said part being further divided into two sub parts so that a first sub part of the inductive sensors is directed towards the upper elevator guide rail element and the rest are directed towards the lower elevator guide rail element. The apparatus further includes a connection board for the inductive sensors, a visualization device, electronics, and a power source.

17 Claims, 4 Drawing Sheets

(56) References Cited

U.S. PATENT DOCUMENTS

| | | | | |
|---|---|---|---|---|
| 2003/0058120 A1* | 3/2003 | Pfenniger | ............. | B66B 7/1246 340/686.2 |
| 2006/0059700 A1* | 3/2006 | Sun | ........................ | G01C 15/00 33/366.24 |
| 2009/0120734 A1* | 5/2009 | Barneman | ............. | B66B 19/002 187/408 |
| 2009/0266651 A1* | 10/2009 | Van Der Meijden | ... | B66B 19/00 187/408 |
| 2011/0067252 A1* | 3/2011 | Van Der Meijden | . | B66B 19/002 33/404 |
| 2015/0128403 A1* | 5/2015 | Valkama | ............... | B66B 19/002 29/464 |
| 2015/0217972 A1* | 8/2015 | Hawkins | ................ | G01C 15/10 187/391 |
| 2016/0068369 A1* | 3/2016 | Valkama | ............... | B66B 5/0087 33/645 |
| 2016/0311648 A1* | 10/2016 | Vaarala | ..................... | B66B 5/00 |
| 2016/0311657 A1* | 10/2016 | Kilpelainen | ............ | B66B 19/00 |
| 2016/0311658 A1* | 10/2016 | Kilpelainen | .......... | B66B 19/002 |
| 2016/0311659 A1* | 10/2016 | Mertala | ................... | E04G 3/246 |
| 2016/0325968 A1* | 11/2016 | Baker | .................... | B66B 19/002 |
| 2017/0001842 A1* | 1/2017 | Puntener | ................ | G01C 15/10 |

\* cited by examiner

APPARATUS AND METHOD FOR ALIGNMENT OF ELEVATOR GUIDE RAILS

FIELD OF THE INVENTION

The invention relates to an apparatus for alignment of an elevator guide rail according to the preamble of claim 1.

The invention relates also to a method according to the preamble of claim 10.

BACKGROUND ART

An elevator comprises an elevator car, lifting machinery, ropes, and a counter weight. The elevator car is supported on a sling surrounding the elevator car. The lifting machinery comprises a traction sheave, a machinery brake and an electric motor being connected via a shaft. The electric motor is used to rotate the traction sheave and the machinery brake is used to stop the rotation of the traction sheave. The lifting machinery is situated in a machine room. The lifting machinery moves the car upwards and downwards in a vertically extending elevator shaft. The sling and thereby also the elevator car is carried by the ropes, which connect the elevator car over the traction sheave to the counter weight. The sling of the elevator car is further supported with gliding means at guide rails extending in the vertical direction in the elevator shaft. The gliding means can comprise rolls rolling on the guide rails or gliding shoes gliding on the guide rails when the elevator car is moving upwards and downwards in the elevator shaft. The guide rails are supported with fastening brackets at the side wall structures of the elevator shaft. The gliding means engaging with the guide rails keep the elevator car in position in the horizontal plane when the elevator car moves upwards and downwards in the elevator shaft. The counter weight is supported in a corresponding way on guide rails supported on the wall structure of the elevator shaft. The elevator car transports people and/or goods between the landings in the building. The elevator shaft can be formed so that the wall structure is formed of solid walls or so that the wall structure is formed of an open steel structure.

The cross section of the guide rails has normally the form of a letter T. The horizontal branch of the letter T is attached to support brackets being attached to the wall structure of the elevator shaft. The vertical branch of the letter T forms three gliding surfaces for the gliding means. There are thus two opposite side gliding surfaces and one front gliding surface in the guide rail. The gliding means comprises normally a frame part and a gliding part. The horizontal cross-section of the gliding part has the form of a letter U so that the inner surface of the gliding part sets against the three gliding surfaces of the guide rail. The horizontal cross section of the frame part has also a U-shaped section surrounding the gliding part on three sides. The frame part comprises further outwardly extending flanges at the bottom of the letter U for attaching the gliding means to the car sling. There are elasticity means between the gliding part and the frame part in order to isolate the gliding part from the frame part.

The guide rails are formed of guide rail elements of a certain length. The guide rail elements are connected in the installation phase end-on-end one after the other in the elevator shaft. It is difficult and time consuming to align two consecutive guide rail elements so that there is no mismatch between the ends of the guide rail elements. The alignment is done by using a long straight metallic square bar which is placed against the front surface of the guide rails. The square bar is positioned over the joint of two consecutive guide rail elements so that the upper portion of the square bar extends in the vertical direction along the upper guide rail and the lower portion of the square bar extends in the vertical direction along the lower guide rail. When this square bar is in position, a source of light is placed on one side of the guide rail and the mechanic looks at the joint from the opposite side of the guide rail. Misalignment of two consecutive guide rail elements, means that there is a gap between the reference square bar and the guide rail elements. This misalignment can be observed by the technic looking at the joint by the light passing through the gap. The alignment is done by forcing and/or moving the support bracket into a desired position with a hand tool after which the bolts are tightened in order to keep the guide rail element in the desired position. The quality of the alignment will vary depending on the mechanic who is doing the alignment.

BRIEF DESCRIPTION OF THE INVENTION

An object of the present invention is to present a novel apparatus and method for alignment of elevator guide rails.

The apparatus comprises:

a stationary part being attachable to an elevator guide rail element at a predetermined height above a joint between two consecutive end-on-end mounted elevator guide rail elements, an elongated measuring frame having an upper end and a lower end, the upper end being supported with an articulated joint at the stationary part, a number of inductive sensors being positioned on the measuring frame, whereby at least a part of the inductive sensors are directed in a first direction being the direction between the guide rails towards a tip of the guide rail elements, said part being further divided into two sub parts so that a first sub part of the inductive sensors is directed towards the upper elevator guide rail element and the rest are directed towards the lower elevator guide rail element, a connection board for the inductive sensors, visualization means, electronics, and a power source.

The method comprises the steps of:

attaching a stationary part of an apparatus for alignment of elevator guide rails to an elevator guide rail element at a predetermined height above a joint between two consecutive end-on-end mounted elevator guide rail elements, waiting until the pendulum movement of an elongated measuring frame stops, said measuring frame having an upper end and a lower end, the upper end being supported with an articulated joint at the stationary part, measuring the position of the ends of the two consecutive guide rail elements with a number of inductive sensors being positioned on the measuring frame, whereby at least a part of the inductive sensors are directed in a first direction being the direction between the guide rails towards a tip of the guide rail elements, said part being further divided into two sub parts so that a first sub part of the inductive sensors is directed towards the upper elevator guide rail element and the rest are directed towards the lower elevator guide rail element, reading the result of the measuring on a visualization means, aligning the guide rail elements according to the result of the measurement.

The apparatus can be used in connection with two consecutive guide rail elements when the guide rail elements are to be attached end-on-end to the support brackets.

The apparatus provides a means for real-time measurement of the alignment of the two consecutive guide rail elements when the technician is attaching the guide rail elements to the support brackets. The technician can immediately see the impact on the alignment of the two consecutive guide rail elements when he moves either of the two consecutive guide rail elements. The technician can use a special aligning tool developed for this purpose or then he can move the rail elements by simple hand tools in order to reposition the guide rail elements.

The apparatus will speed up the process-step of aligning guide rail elements compared to prior art methods. The apparatus will also eliminate variations in the quality of the alignment. The quality of the alignment will be less dependent on the person performing the alignment. Every technician can easily make a high quality alignment with the help of the apparatus.

BRIEF DESCRIPTION OF THE DRAWINGS

The invention will in the following be described in greater detail by means of preferred embodiments with reference to the attached drawings, in which.

DETAILED DESCRIPTION OF EMBODIMENTS OF THE INVENTION

Figure 1:
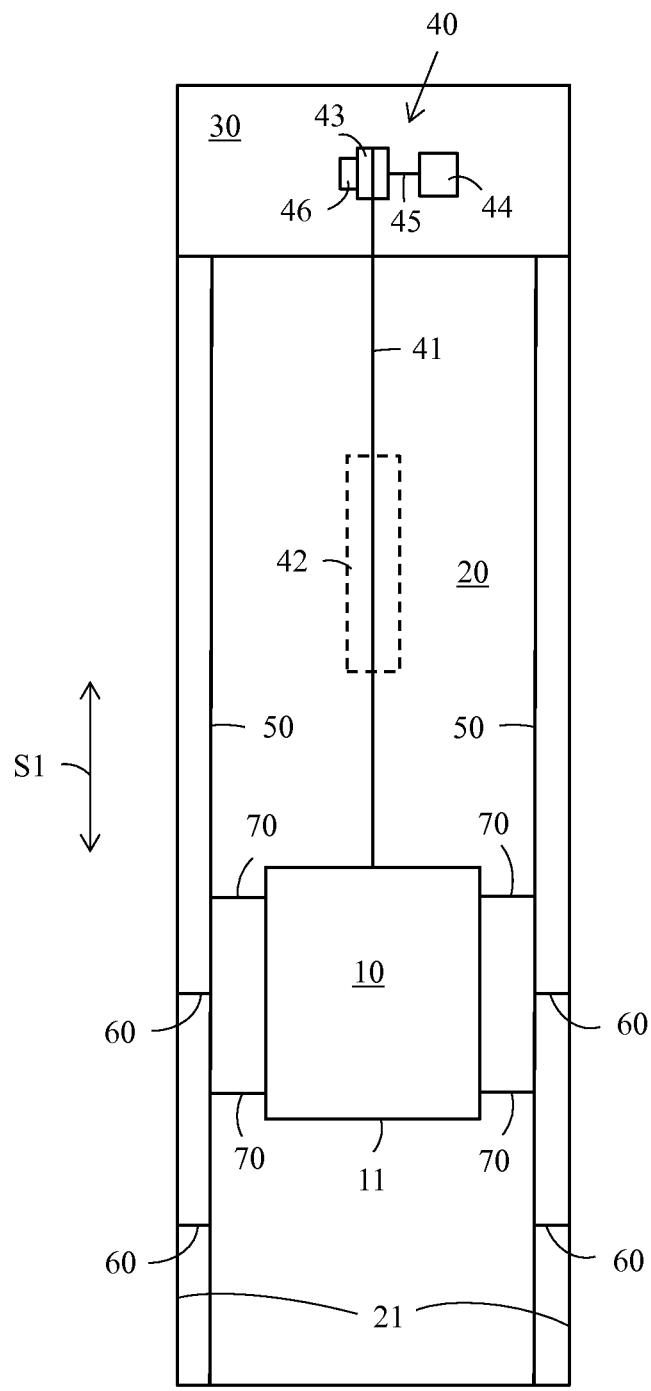
FIG. 1 shows a vertical cross section of an elevator.

FIG. 1 shows a vertical cross section of an elevator. The elevator comprises an elevator car 10, lifting machinery 40, ropes 41, and a counter weight 42. The elevator car 10 is supported on a sling 11 surrounding the elevator car 10. The lifting machinery 40 comprises a traction sheave 43, a machinery brake 46 and an electric motor 44 being connected via a shaft 45. The electric motor 44 is used to rotate the traction sheave 43 and the machinery brake 46 is used to stop the rotation of the traction sheave 43. The lifting machinery 40 is situated in a machine room 30. The lifting machinery 40 moves the car 10 upwards and downwards S1 in a vertically extending elevator shaft 20. The sling 11 and thereby also the elevator car 10 is carried by the ropes 41, which connect the elevator car 10 over the traction sheave 43 to the counter weight 42. The sling 11 of the elevator car 10 is further supported with gliding means 70 at guide rails 50 extending in the vertical direction in the elevator shaft 20. The figure shows two guide rails 50 at opposite sides of the elevator car 10. The gliding means 70 can comprise rolls rolling on the guide rails 50 or gliding shoes gliding on the guide rails 50 when the elevator car 10 is mowing upwards and downwards in the elevator shaft 20. The guide rails 50 are supported with fastening brackets 60 at the side wall structures 21 of the elevator shaft 20. The figure shows only two fastening brackets 60, but there are several fastening brackets 60 along the height of each guide rail 50. The gliding means 70 engaging with the guide rails 50 keep the elevator car 10 in position in the horizontal plane when the elevator car 10 moves upwards and downwards in the elevator shaft 20. The counter weight 42 is supported in a corresponding way on guide rails supported on the wall structure 21 of the elevator shaft 20. The elevator car 10 transports people and/or goods between the landings in the building. The elevator shaft 20 can be formed so that the wall structure 21 is formed of solid walls or so that the wall structure 21 is formed of an open steel structure.

The guide rails 50 extend vertically along the height of the elevator shaft 20. The guide rails 50 are thus formed of guide rail elements of a certain length e.g. 5 m. The guide rail elements are connected in the installation phase end-on-end one after the other. It is time consuming to install the guide rails 50 so that they are properly aligned along the whole height of the elevator shaft 20. The alignment is done by using a long straight metallic square bar which is placed against the front surface of two consecutive guide rail elements. The square bar is positioned over the joint of two consecutive guide rail elements so that the upper portion of the square bar extends in the vertical direction along the upper guide rail element and the lower portion of the square bar extends in the vertical direction along the lower guide rail element. When this square bar is in position, a light source is placed on one side of the guide rail 50 and the mechanic looks at the joint from the opposite side of the guide rail 50. Misalignment of two consecutive guide rail elements, means that there is a gap between the reference square bar and the guide rail elements. This misalignment can be observed by the technic looking at the joint by the light passing through the gap. The alignment is done by forcing and/or moving the support bracket into a desired position with a hand tool after which the bolts are tightened in order to keep the guide rail element in the desired position. The quality of the alignment will vary depending on the mechanic who is doing the alignment.

Variations in the alignment of the guide rail 50 will result in lateral forces acting on the gliding means 70 when the car 10 moves upwards and downwards in the elevator shaft 20. These lateral forces might cause vibrations to the gliding means 70 and thereby also to the car 10. The vibrations acting on the elevator car 10 will also cause noise disturbing the passengers in the elevator car 10.

Figure 2:
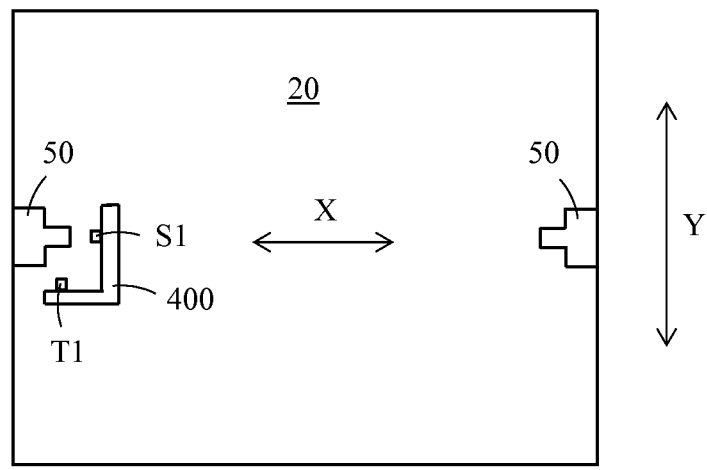
FIG. 2 shows a horizontal cross section of an elevator shaft.

FIG. 2 shows a horizontal cross section of an elevator shaft. The figure shows the guide rails 50 at opposite sides of the elevator shaft 20. The direction X is the direction between the rails 50 and the direction Y is the back-to-front direction in the shaft 20. The direction Y is thus perpendicular to the direction X. The figure shows also an apparatus 400 for aligning elevator guide rails according to the invention in connection with one of the guide rails 50. The apparatus 400 is provided with inductive sensors S1 measuring in the X direction i.e. being directed towards the tip of the guide rail 50 and inductive sensors T1 measuring in the Y direction i.e. being directed to the side surface of the guide rail. The aligning apparatus 400 will be described more in detail in connection with FIG. 3.

Figure 3:
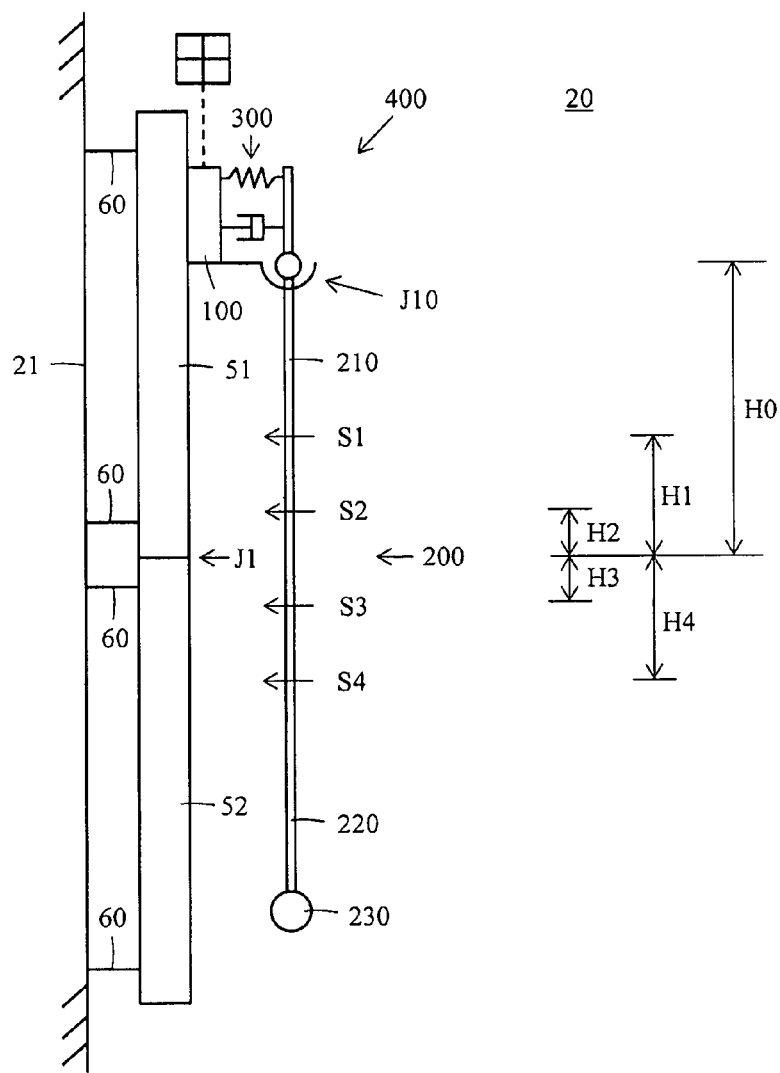
FIG. 3 shows an apparatus for aligning of guide rails according to the invention.

FIG. 3 shows an apparatus for aligning elevator guide rails according to the invention. The figure shows two consecutive guide rail elements 51, 52 which are connected end-on-end one after the other in the elevator shaft 20. The end-on-end connection forms a joint J1 between the guide rail elements 51, 52. The guide rail elements 51, 52 are attached to the wall structure 21 of the elevator shaft 20 with brackets 60. The aligning apparatus 400 comprises a stationary part 100 and an elongated measuring frame 200. The stationary part 100 can be attached to the guide rail element 51, 52. The measuring frame 200 has an upper end 210 and a lower end 220. The upper end 210 is supported with an articulated joint J10 at the stationary part 100. There is a weight 230 attached to the lower end 220 of the measuring frame 200. The measuring frame 200 comprises further a number of inductive sensors S1, S2, S3, S4 directed towards the guide rail elements 51, 52 and measuring in the X direction. There is further an attenuation system 300 between the stationary part 100 and the upper end 210 of the measuring frame 200 above the articulated joint J10. The attenuation system 300 attenuates the pendulum movement of the measuring frame 200 so that the equilibrium is achieved faster. The attenuation system also helps to avoid vibrations originating from the operator during the measurement. The software controlling the measurement system can also be adapted to filter vibrations and correct movements of the measuring frame 200.

The stationary part 100 is attached to the upper guide rail element 51 by a magnetic or mechanical clamping system. The attachment of the stationary part 100 to the upper guide rail element 51 must on the one hand be rigid and on the other hand easy to connect and disconnect. The stationary part 100 is attached to the upper guide rail element 51 at a predetermined vertical distance H0 above the joint J1 between the two consecutive guide rail elements 51, 52. A first half S1, S2 of the inductive sensors S1, S2, S3, S4 measuring in the X direction will be situated above the joint J1 and the other half S3, S4 of the inductive sensors S1, S2, S3, S4 will be situated under the joint J1. The first inductive sensor S1 is positioned at a vertical distance H1 above the joint J1 and the fourth inductive sensor S4 is positioned at a vertical distance H4 under the joint J1. The second inductive sensor S2 is positioned at a vertical distance H2 above the joint J1 and the third inductive sensor S3 is positioned at a vertical distance H3 under the joint J1. The position of the inductive sensors S1, S2, S3, S4 is symmetrical in relation to the joint J1, which means that the vertical distance H1 equals to the vertical distance D4 and the vertical distance H2 equals to the vertical distance H3.

The inductive sensors T1 measuring in the Y direction shown in FIG. 2 can be positioned in a corresponding way on the measuring frame 200. It is also possible to have two parallel rows of inductive sensors measuring in the Y direction. This would make it possible also to measure the relative twist of the two rail elements 51, 52.

The connection board for the inductive sensors S1, S2, S3, S4, the read outs, the visualization screen, the electronics, and the power source may all be positioned within the stationary part 100. The inductive sensors S1, S2, S3, S4 can be connected with cables to the connection board within the stationary part 100.

The measuring frame 200 is connected to the stationary part 100 by means of a low friction articulated joint J10. The function of the weight 230 at the lower end 220 of the measuring frame 200 is to add stability to the measuring frame 200 and to help overcome the minimal frictions caused by the articulated joint J10 to the pendulum movement of the measuring frame 200 in order to ensure that the measuring frame 200 sets into a vertical position before the measurement begins. The measurement system measures the relative position of the two rail elements 51, 52 i.e. the position of the two rail elements 51, 52 in relation to each other and it is therefore not necessary that the measurement frame 200 remains perfectly vertical during the measurement and adjustment process.

The inductive sensors S1, S2, S3, S4 are used to measure the distance between the tips of the ends of the two consecutive guide rail elements 51, 52 and the back to front distance of the two consecutive guide rail elements 51, 52.

The number of inductive sensors in the X direction and in the Y direction on each side of the joint J1 determines the phenomenon that can be measured. With two sensors at each side of the joint J1 measuring in the X direction it is possible to measure the step between the rails and the incident angle of the rail elements at the joint. With three sensors at each side of the joint J1 measuring in the X direction it is also possible to estimate the curvature of the rails in the X direction and thereby achieve a more accurate incident angle calculation.

Figure 4:
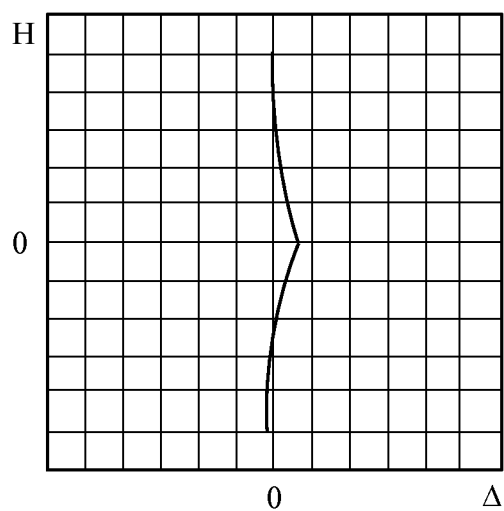
FIG. 4 shows a graph of a measurement in the X-direction.

FIG. 4 shows a graph of a measurement in the X-direction. The horizontal axis Δ indicates the position of the ends of the two consecutive guide rail elements 51, 52 in the X-direction of the elevator shaft 20. The vertical axis H in the graph indicates the position of the sensor in the vertical direction as shown in FIG. 3. The graph shows that the lower end of the upper guide rail element 51 is slightly bent to the right in the figure. The graph shows also that the upper end of the lower guide rail element 52 is also slightly bent to the right in the figure. The ends of the guide rail elements 51, 52 are thus bent in the X direction out from the side wall of the shaft 20.

Figure 5:
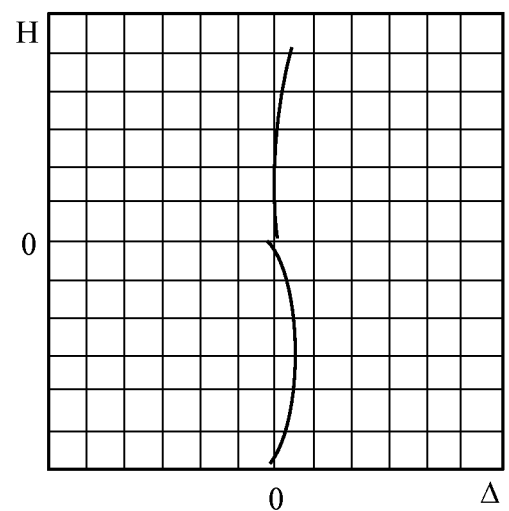
FIG. 5 shows a graph of the same measurement in the Y-direction.

FIG. 5 shows a graph of a corresponding measurement in the Y-direction of the shaft 20. The horizontal axis Δ on the graph indicates the position of the ends of the two consecutive guide rail elements 51, 52 in the Y-direction of the elevator shaft 20. The vertical axis H indicates the position of the sensor in the vertical direction as shown in FIG. 3. The graph shows that the lower end of the upper guide rail element 51 is in a correct position. The graph shows also that the upper end of the lower guide rail element 52 is bent to the left in the figure. The upper end of the lower guide rail element 52 is thus bent towards the front side of the shaft 20.

Figure 6:
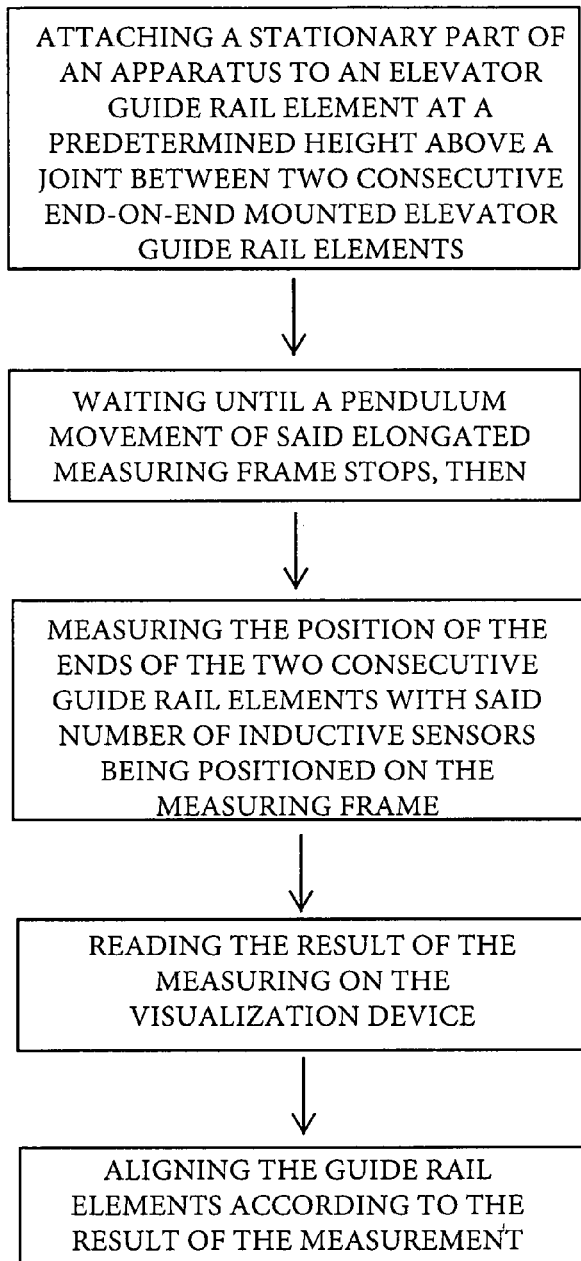
FIG. 6 shows a block diagram of a method for aligning an elevator guide rail.

FIG. 6 shows a block diagram of a method for aligning an elevator guide rail, comprising the steps of attaching a stationary part of an apparatus for alignment of elevator guide rails at a predetermined height above a joint between two consecutive end-on-end mounted elevator guide rail elements, waiting until the pendulum movement of an elongated measuring frame stops, then measuring the position of the ends of the two consecutive guide rail elements with a number of inductive sensors being positioned on the measuring frame, reading the result of the measuring on a visualization device, and aligning the guide rail elements according to the result of the measurement.

The use of the invention is naturally not limited to the type of elevator disclosed in FIG. 1, but the invention can be used in any type of elevator e.g. also in elevators lacking a machine room and/or a counterweight.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for alignment of elevator guide rails, wherein the apparatus comprises:
    a stationary part being attachable to an elevator guide rail element at a predetermined height above a joint between two consecutive end-on-end mounted elevator guide rail elements, including an upper elevator guide rail element and a lower elevator guide rail element, wherein the upper elevator guide rail element is located above the lower elevator guide rail element;
    an elongated measuring frame having an upper end and a lower end, the upper end being supported with an articulated joint at the stationary part;
    a number of inductive sensors being positioned on the measuring frame, whereby at least one inductive sensor is directed in a first direction being the direction towards a tip of a respective one of the guide rail elements, wherein said tip is an innermost surface of the guide rail elements facing a horizontal direction and wherein at least one of said number of inductive sensors is directed towards the upper elevator guide rail element and at least another one of said number of inductive sensors is directed towards the lower elevator guide rail element;

a connection board connected to the number of inductive sensors, and a visualization device for reading the results of measurement obtained from said number of inductive sensors.

2. The apparatus according to claim 1, wherein:
a plurality of said number of inductive sensors are directed in a second direction being a direction towards a side surface of the guide rail elements, and
said plurality of said number of inductive sensors includes at least one inductive sensor directed towards the upper elevator guide rail element and at least one inductive sensor directed towards the lower elevator guide rail element.

3. The apparatus according to claim 2, wherein the inductive sensors measuring in the second direction comprises two rows of inductive sensors at a distance from each other, whereby a twist of the guide elements can be measured.

4. The apparatus according to claim 3, wherein the connection board and the visualization device are integrated into the stationary part.

5. The apparatus according to claim 3, wherein a weight is attached to the lower end of the measuring frame.

6. The apparatus according to claim 2, wherein the connection board and the visualization device are integrated into the stationary part.

7. The apparatus according to claim 2, wherein a weight is attached to the lower end of the measuring frame.

8. The apparatus according to claim 1, wherein said at least one of said number of inductive sensors directed towards the upper elevator guide rail element comprises two inductive sensors, and
wherein at least said at least one of said number of inductive sensors directed towards the lower elevator guide rail element comprises two inductive sensors.

9. The apparatus according to claim 8, wherein the connection board and the visualization device are integrated into the stationary part.

10. The apparatus according to claim 8, wherein a weight is attached to the lower end of the measuring frame.

11. The apparatus according to claim 1, wherein said at least one of said number of inductive sensors directed towards the upper elevator guide rail element comprises three inductive sensors, and
wherein said at least one of said number of inductive sensors directed towards the lower elevator guide rail element comprises three inductive sensors.

12. The apparatus according to claim 11, wherein the connection board and the visualization device are integrated into the stationary part.

13. The apparatus according to claim 1, wherein the inductive sensors are connected to the connection board with cables.

14. The apparatus according to claim 13, wherein the connection board and the visualization device are integrated into the stationary part.

15. The apparatus according to claim 1, wherein the connection board and the visualization device are integrated into the stationary part.

16. The apparatus according to claim 1, wherein a weight is attached to the lower end of the measuring frame.

17. A method for aligning an elevator guide rail, wherein the method comprises the steps of:
attaching the stationary part of the apparatus for alignment of the elevator guide rails according to claim 1 to an elevator guide rail element at a predetermined height above a joint between two consecutive end-on-end mounted elevator guide rail elements;
waiting until a pendulum movement of said elongated measuring frame stops, then;
measuring the position of the ends of the two consecutive guide rail elements with said number of inductive sensors being positioned on the measuring frame;
reading the result of the measuring on the visualization device; and
aligning the guide rail elements according to the result of the measurement.

* * * * *